(12) United States Patent
Harada et al.

(10) Patent No.: US 9,489,977 B1
(45) Date of Patent: Nov. 8, 2016

(54) STORAGE DEVICE, CONTROLLER, AND RECORDING AND REPRODUCING METHOD

(71) Applicant: Kabushiki Kaisha Toshiba, Minato-ku (JP)

(72) Inventors: Kohsuke Harada, Yokohama (JP); Akihiro Yamazaki, Yokohama (JP); Tomokazu Okubo, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/959,373

(22) Filed: Dec. 4, 2015

Related U.S. Application Data

(60) Provisional application No. 62/183,459, filed on Jun. 23, 2015.

(51) Int. Cl.
| | |
|---|---|
| *G11B 5/09* | (2006.01) |
| *G11B 5/02* | (2006.01) |
| *G11B 20/10* | (2006.01) |
| *G11B 20/12* | (2006.01) |
| *G11B 20/14* | (2006.01) |

(52) U.S. Cl.
CPC ..... *G11B 20/10046* (2013.01); *G11B 20/1252* (2013.01); *G11B 20/1496* (2013.01)

(58) Field of Classification Search
CPC ..... G11B 5/00; G11B 5/012; G11B 27/3027; G11B 5/59655; G11B 5/59688; G11B 2220/90; G11B 20/10527; G11B 20/14262; G11B 5/09; G11B 20/1419
USPC .............. 360/29, 32, 40, 43, 44, 48, 55, 131
See application file for complete search history.

(56) References Cited

U.S. PATENT DOCUMENTS

| | | | |
|---|---|---|---|
| 7,920,355 B2 * | 4/2011 | Sakai ................. | G11B 5/59688 360/48 |
| 7,948,708 B2 | 5/2011 | Messner et al. | |
| 8,699,172 B1 | 4/2014 | Gunderson et al. | |
| 8,988,814 B1 | 3/2015 | Harada et al. | |

FOREIGN PATENT DOCUMENTS

| | | |
|---|---|---|
| JP | 08-031568 | 2/1996 |
| JP | 2012-054894 | 3/2012 |

* cited by examiner

*Primary Examiner* — Nabil Hindi
(74) *Attorney, Agent, or Firm* — Oblon, McClelland, Maier & Neustadt, L.L.P.

(57) ABSTRACT

According to one embodiment, there is provided a storage device including a data converter, a recording medium, and an equalizer. The data converter converts data into sets of n number of four-ary symbols according to mapping rules in which $2^{2n-1}$ or fewer types of bit labels are mapped onto the n number of four-ary symbols, where n is an integer of two or greater. Onto the recording medium, the converted n number of four-ary symbols are recorded in the form of a signal of one level among four levels. The equalizer equalizes a signal read from the recording medium into sets of the n number of four-ary symbols.

20 Claims, 10 Drawing Sheets

FIG.2

| SYMBOL "-1" | SYMBOL "+3" | SYMBOL "+1" | SYMBOL "-3" | SYMBOL "-1" |

FIG.3

| 3-BIT LABEL | 4-ARY 2 SYMBOLS |
|---|---|
| 000 | (-3,-3) |
| 001 | (-3,+1) |
| 010 | (-3,+3) |
| 011 | (-1,-1) |
| 100 | (+1,+1) |
| 101 | (+1,-3) |
| 110 | (+3,-3) |
| 111 | (+3,+3) |

| 5-BIT LABEL | 4-ARY 3 SYMBOLS |
|---|---|
| 00000 | (-3,-3,-3) |
| 00001 | (-3,-3,-1) |
| 00010 | (-3,-3,+1) |
| 00011 | (-3,-3,+3) |
| 00100 | (+3,+3,-3) |
| 00101 | (+3,+3,-1) |
| 00110 | (+3,+3,+1) |
| 00111 | (+3,+3,+3) |
| 01000 | (+3,-3,-3) |
| 01001 | (+3,-3,-1) |
| 01010 | (+3,-3,+1) |
| 01011 | (+3,-3,+3) |
| 01100 | (-3,+3,-3) |
| 01101 | (-3,+3,-1) |
| 01110 | (-3,+3,+1) |
| 01111 | (-3,+3,+3) |
| 10000 | (-1,-1,-3) |
| 10001 | (-1,-1,-1) |
| 10010 | (-1,-1,+1) |
| 10011 | (-1,-1,+3) |
| 10100 | (+1,+1,-3) |
| 10101 | (+1,+1,-1) |
| 10110 | (+1,+1,+1) |
| 10111 | (+1,+1,+3) |
| 11000 | (-3,-1,-1) |
| 11001 | (-3,-1,+1) |
| 11010 | (-1,-3,-3) |
| 11011 | (-1,+3,-1) |
| 11100 | (+1,-3,+1) |
| 11101 | (+1,+3,+3) |
| 11110 | (+3,+1,-1) |
| 11111 | (+3,-1,+1) |

FIG. 8

| 7-BIT LABEL | 4-ARY 4-SYMBOL LABEL | 7-BIT LABEL | 4-ARY 4-SYMBOL LABEL | 7-BIT LABEL | 4-ARY 4-SYMBOL LABEL | 7-BIT LABEL | 4-ARY 4-SYMBOL LABEL |
|---|---|---|---|---|---|---|---|
| 0000000 | (-3,-3,-3,-3) | 0100000 | (-3,-3,+1,+1) | 1000000 | (+1,-3,-3,-3) | 1100000 | (+3,-3,+1,+1) |
| 0000001 | (-3,-3,-3,-1) | 0100001 | (-3,-3,+3,+3) | 1000001 | (+1,-3,-3,-1) | 1100001 | (+3,-3,+3,+3) |
| 0000010 | (-3,-3,-3,+1) | 0100010 | (-3,+3,+3,+1) | 1000010 | (+1,-3,-3,+1) | 1100010 | (+3,-1,-3,-3) |
| 0000011 | (-3,-3,-3,+3) | 0100011 | (-3,+3,+3,-1) | 1000011 | (+1,-3,-1,-3) | 1100011 | (+3,-1,-1,-3) |
| 0000100 | (-3,-3,-1,-3) | 0100100 | (-3,-3,-3,+3) | 1000100 | (+1,-3,+3,+3) | 1100100 | (+3,-1,-1,-1) |
| 0000101 | (-3,-3,-1,-1) | 0100101 | (-1,-3,-3,-3) | 1000101 | (+1,-3,-1,-1) | 1100101 | (+3,-1,-1,+1) |
| 0000110 | (-3,-3,-1,+1) | 0100110 | (-1,-3,-3,+3) | 1000110 | (+1,-3,+1,+1) | 1100110 | (+3,-1,+1,+3) |
| 0000111 | (-3,-3,-1,+3) | 0100111 | (-1,-3,-1,+3) | 1000111 | (+1,-3,+3,-3) | 1100111 | (+3,-1,+1,+1) |
| 0001000 | (-3,-3,+1,-3) | 0101000 | (-1,-3,+1,+1) | 1001000 | (+1,-1,-3,-3) | 1101000 | (+3,+1,-3,-3) |
| 0001001 | (-3,-3,+1,-1) | 0101001 | (-1,-3,+1,+3) | 1001001 | (+1,-1,-3,+1) | 1101001 | (+3,+1,-1,+1) |
| 0001010 | (-3,-3,+1,+1) | 0101010 | (-1,-3,+3,-3) | 1001010 | (+1,+1,-3,-3) | 1101010 | (+3,+1,-1,+3) |
| 0001011 | (-3,-3,+1,+3) | 0101011 | (-1,-1,-3,-3) | 1001011 | (+1,+1,+1,-3) | 1101011 | (+3,+1,+1,-3) |
| 0001100 | (-3,-3,+3,-3) | 0101100 | (-1,-1,-1,-3) | 1001100 | (+1,+1,+1,+3) | 1101100 | (+3,+1,+1,+1) |
| 0001101 | (-3,-3,+3,-1) | 0101101 | (-1,-1,-1,+1) | 1001101 | (+1,+1,+3,-1) | 1101101 | (+3,+1,+1,+3) |
| 0001110 | (-3,-3,+3,+1) | 0101110 | (-1,-1,-1,+3) | 1001110 | (+1,+1,+3,+1) | 1101110 | (+3,+1,+3,-3) |
| 0001111 | (-3,-3,+3,+3) | 0101111 | (-1,-1,+1,+1) | 1001111 | (+1,+1,+3,+3) | 1101111 | (+3,+1,+3,-1) |
| 0010000 | (-3,-1,-3,-3) | 0110000 | (-1,-1,+3,-3) | 1010000 | (+1,+3,-3,-3) | 1110000 | (+3,+3,-3,+1) |
| 0010001 | (-3,-1,-3,+1) | 0110001 | (-1,+1,-3,-1) | 1010001 | (+1,+3,-1,-3) | 1110001 | (+3,+3,-3,+3) |
| 0010010 | (-3,-1,-1,-3) | 0110010 | (-1,+1,-1,-3) | 1010010 | (+1,+3,+1,-3) | 1110010 | (+3,+3,-1,-3) |
| 0010011 | (-3,-1,-1,+3) | 0110011 | (-1,+1,-1,+3) | 1010011 | (+1,+3,+1,-1) | 1110011 | (+3,+3,-1,-1) |
| 0010100 | (-3,-1,+1,-3) | 0110100 | (-1,+1,+1,+1) | 1010100 | (+1,+3,+1,+1) | 1110100 | (+3,+3,-1,+1) |
| 0010101 | (-3,-1,+1,+1) | 0110101 | (-1,+1,+1,+3) | 1010101 | (+1,+3,+1,+3) | 1110101 | (+3,+3,-1,+3) |
| 0010110 | (-3,-1,+3,+1) | 0110110 | (-1,+1,+3,-3) | 1010110 | (+1,+3,+3,-3) | 1110110 | (+3,+3,+1,-3) |
| 0010111 | (-3,-1,+3,+3) | 0110111 | (-1,+1,+3,+1) | 1010111 | (+1,+3,+3,-1) | 1110111 | (+3,+3,+1,-1) |
| 0011000 | (-3,+1,-3,+1) | 0111000 | (-1,+3,-3,-3) | 1011000 | (+3,-3,-3,-3) | 1111000 | (+3,+3,+1,+1) |
| 0011001 | (-3,+1,-1,+1) | 0111001 | (-1,+3,-3,-1) | 1011001 | (+3,-3,-3,-1) | 1111001 | (+3,+3,+1,+3) |
| 0011010 | (-3,+1,+1,-3) | 0111010 | (-1,+3,-1,+3) | 1011010 | (+3,-3,-3,+1) | 1111010 | (+3,+3,+3,-3) |
| 0011011 | (-3,+1,+1,-1) | 0111011 | (-1,+3,+1,+1) | 1011011 | (+3,-3,-1,+1) | 1111011 | (+3,+3,+3,-1) |
| 0011100 | (-3,+1,+1,+1) | 0111100 | (-1,+3,+1,+3) | 1011100 | (+3,-3,+1,-3) | 1111100 | (+3,+3,+3,+1) |
| 0011101 | (-3,+1,+1,+3) | 0111101 | (-1,+3,+3,+1) | 1011101 | (+3,-3,+1,-1) | 1111101 | (+3,+3,+3,+3) |
| 0011110 | (-3,+1,+3,-3) | 0111110 | (-1,+3,+3,+3) | 1011110 | (+3,-3,+1,+3) | 1111110 | (+3,+5,+3,+1) |
| 0011111 | (-3,+1,+3,-1) | 0111111 | (-1,+3,+3,+3) | 1011111 | (+3,-3,-3,-1) | 1111111 | (+3,+3,+3,+3) |

STORAGE DEVICE, CONTROLLER, AND RECORDING AND REPRODUCING METHOD

CROSS-REFERENCE TO RELATED APPLICATIONS

This application is based upon and claims the benefit of priority from U.S. Provisional Application No. 62/183,459, filed on Jun. 23, 2015; the entire contents of which are incorporated herein by reference.

FIELD

Embodiments described herein relate generally to a storage device, a controller, and a recording and reproducing method.

BACKGROUND

In storage devices such as magnetic disk devices, the value of an information bit is represented by a magnetization direction on a recording medium, and hence an increase in a record density of the recording medium may cause inter-symbol interference, so that the quality of the reproduced signal degrades.

BRIEF DESCRIPTION OF THE DRAWINGS

FIG. 8 is a diagram showing another example of mapping rules in the embodiment;

DETAILED DESCRIPTION

In general, according to one embodiment, there is provided a storage device including a data converter, a recording medium, and an equalizer. The data converter converts data into sets of n number of four-ary symbols according to mapping rules in which $2^{2n-1}$ or fewer types of bit labels are mapped onto the n number of four-ary symbols, where n is an integer of two or greater. Onto the recording medium, the converted n number of four-ary symbols are recorded in the form of a signal of one level among four levels. The equalizer equalizes a signal read from the recording medium into sets of the n number of four-ary symbols.

Exemplary embodiments of a storage device will be explained below in detail with reference to the accompanying drawings. The present invention is not limited to the following embodiments.

Embodiment

Figure 1:
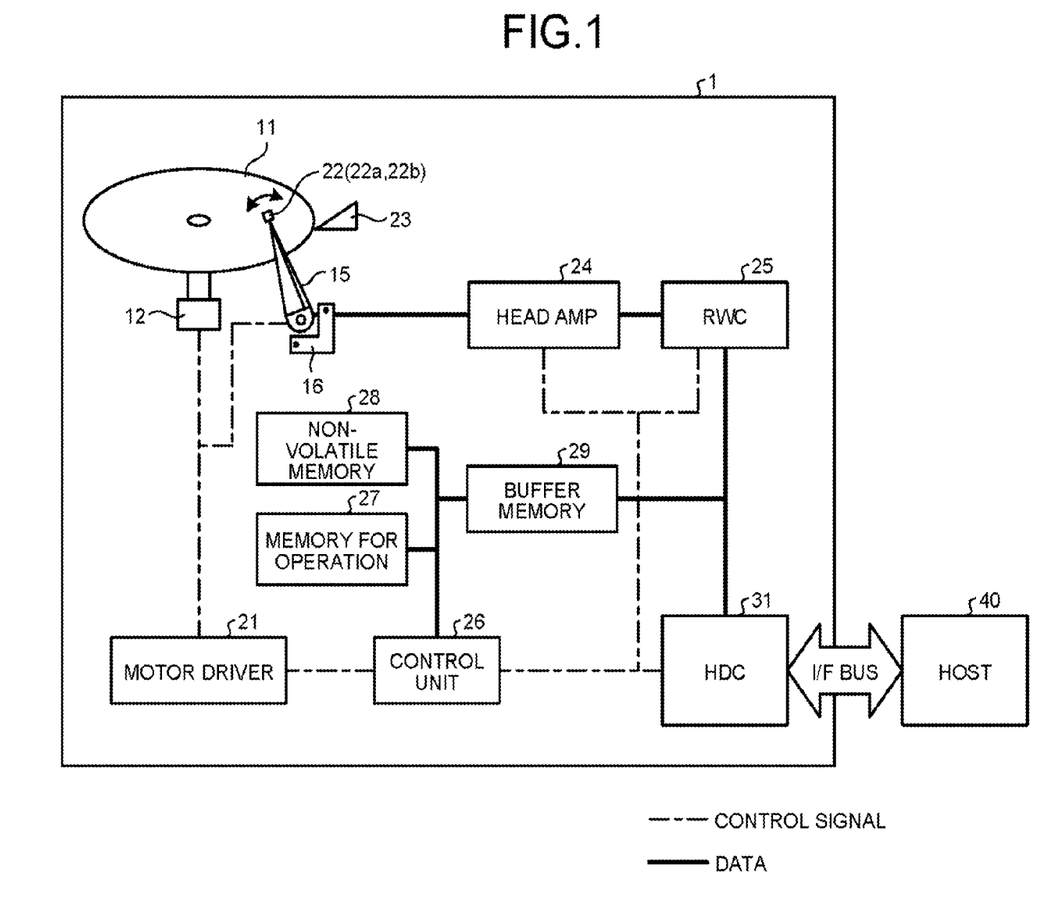
FIG. 1 is a diagram showing configuration of a storage device according to an embodiment.

A storage device 1 according to the embodiment will be described. The storage device 1 has a recording medium and records information onto the recording medium according to a request from a host 40. The recording medium includes, for example, a disk medium (e.g., a magnetic disk, an optical disk, or a magneto-optical disk), a semiconductor memory, and the like. The storage device 1 is, for example, a magnetic disk device, an SSD, a magneto-optical disk device, an optical disk device, or the like. Although the case where the recording medium is a disk medium (magnetic disk) and where the storage device 1 is a magnetic disk device will be illustrated below, the present embodiment can be applied to other cases as well.

The storage device 1 records information onto a recording medium 11 via, e.g., a head 22 and reads a signal from the recording medium 11 via the head 22. Specifically, the storage device 1 comprises the recording medium 11, a spindle motor 12, a motor driver 21, the head 22, an actuator arm 15, a voice coil motor (VCM) 16, a ramp 23, a head amplifier 24, a read write channel (RWC) 25, a hard disk controller (HDC) 31, a buffer memory 29, and a control unit 26.

The recording medium 11 is rotated by the spindle motor 12 with a rotation axis as center at particular rotation speed. The rotation of the spindle motor 12 is driven by the motor driver 21. The recording medium 11 may be a disk medium such as a magnetic disk or a magneto-optical disk. The recording medium 11 has, for example, a vertical magnetic recording layer. For example, a plurality of servo areas extending in radial directions from the vicinity of the center of the recording medium 11 are defined on the front and back sides of the recording medium 11. The servo areas may be arranged at substantially equal intervals along a circumferential direction. For example, servo information including servo patterns is recorded on the servo areas. Further, a plurality of concentric circle-shaped tracks are defined outward from the vicinity of the center of the recording medium 11 on the front and back sides of the recording medium 11 by the servo patterns. Yet further, on each track, sector areas including a servo area, a sync mark, and a data area are arranged repeatedly. The sync mark indicates the start of the data area.

The head 22 writes and reads data onto and from the recording medium 11 by a write head 22a and a read head 22b provided therein. The head 22 is located at the tip of an actuator arm 15 and moved by the VCM 16 driven by the motor driver 21 along the radial direction (track-width direction) of the recording medium 11. While the rotation of the recording medium 11 is stopped, and so on, the head 22 is evacuated onto the ramp 23.

The head amplifier 24 amplifies a signal read by the head 22 from the recording medium 11 to output and supply to the RWC 25. Further, the head amplifier 24 amplifies a signal supplied from the RWC 25 to write data onto the recording medium 11 and supplies to the head 22.

The HDC 31 performs control of transmission/reception of data to/from the host 40 via an I/F bus, control of the buffer memory 29, data error correction on recorded data, and the like. The buffer memory 29 is used as a cache for data which is to be transmitted to or to be received from the host 40. Further, the buffer memory 29 is used to temporarily store data read from the recording medium 11, data to be written onto the recording medium 11, or control firmware read from the recording medium 11, and so on.

The RWC 25 code modulates data to be written onto the recording medium 11 supplied from the HDC 31 to supply to the head amplifier 24. Further, the RWC 25 code demodulates a signal read from the recording medium 11 and supplied from the head amplifier 24 into digital data to output to the HDC 31.

A memory 27 for operation (e.g., an SRAM: Static Random Access Memory), a nonvolatile memory 28 (e.g., a Flash ROM: Flash Read Only Memory), and a buffer memory 29 for temporary storage (e.g., DRAM: Dynamic Random Access Memory) are connected to the control unit 26. The control unit 26 controls the storage device 1 overall according to firmware stored beforehand in the nonvolatile memory 28 and the recording medium 11. The control unit 26 is, for example, a CPU. The firmware includes initial firmware and control firmware used for usual operation. The initial firmware executed first at startup is stored in, e.g., the nonvolatile memory 28. The control firmware may include part of the function of a controller 50 (see FIG. 10) as described later. The control firmware used for usual operation is stored on the recording medium 11 and, by control according to the initial firmware, read from the recording medium 11 into the buffer memory 29 for temporary storage and then stored into the memory 27 for operation.

In the storage device 1, the value of an information bit is represented by a magnetization direction on the recording medium 11, and hence an increase in the record density on the recording medium 11 may cause inter-symbol interference, so that the quality of the reproduced signal degrades. For example, in an information recording method in which binary symbols are recorded onto the recording medium 11, when the record density is increased, inter-symbol interference is more likely to occur, and thus it is difficult to achieve both suppression of degradation in the quality of the reproduced signal and improvement of information record density.

Accordingly, in the present embodiment, the storage device 1 holds mapping rules in which bit labels are mapped preferentially onto patterns higher in noise tolerance from among multiple patterns which can be taken on by n number of four-ary symbols, where n is an integer of two or greater, and converts data (a bit pattern) into n number of four-ary symbols according to the mapping rules to record onto the recording medium 11, thereby achieving both suppression of degradation in the quality of the reproduced signal and improvement of information record density.

For example, the storage device 1 can increase the amount of information per record symbol by dealing with four-ary record symbols. Thus, even if the linear record density, i.e., record frequency of symbols on the recording medium 11 is lowered, the record density per bit (information amount unit) can be improved, so that information record density can be improved while inter-symbol interference is suppressed. Further, by selectively making patterns higher in noise tolerance from among multiple patterns which can be taken on by n number of four-ary symbols be included in the mapping rules, the S/N ratio of the reproduced signal in reproducing n number of four-ary symbols can be improved. Therefore, while improving the record density of information, degradation in the quality (reliability) of the reproduced signal can be suppressed, or the quality (reliability) of the reproduced signal can be improved. Note that n is an integer of two or greater.

Figure 2:
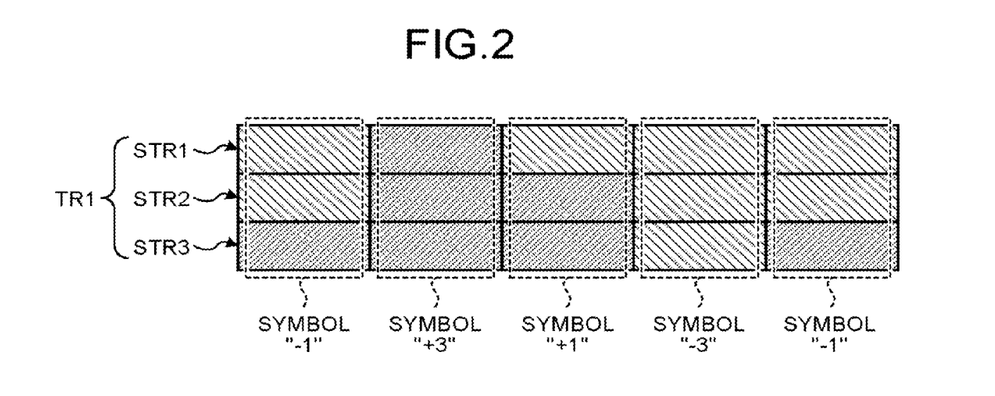
FIG. 2 is a diagram showing record magnetized states of a track in the embodiment.

A first feature of the present embodiment is that four levels (e.g., +3, +1, −1, −3) are defined for the record states of one record symbol, thereby increasing the real number of information bits that can be recorded in one record symbol. For example, one method which realizes four levels of magnetized states is to provide three sub-tracks STR1 to STR3 in one reproduction track TR1 as shown in FIG. 2. For example, as to the sub-tracks STR1 to STR3, the state of being magnetized in a first direction is denoted by "+1" (indicated by dense hatching in FIG. 2), and the state of being magnetized in a second direction opposite to the first direction is denoted by "−1" (indicated by coarse hatching in FIG. 2). Here, a method can be thought of in which four levels are denoted by combinations of the binary record states of the three sub-tracks STR1, STR2, STR3 arranged along an across-track direction: (+1,+1,+1)=+3, (−1,+1,+1)=+1, (−1,−1,+1)=−1, and (−1,−1,−1)=−3. In addition, a method which performs four levels of unsaturated recording, and the like can be thought of.

When considering four levels of recording per record symbol, two bits (=four ary) of information can be dealt with by one record symbol, and thus, if the same amount of information is recorded, the record frequency is half of that of binary recording. That is, in this case, the amount of inter-symbol interference in the recorded signal becomes half, and thus reproduction of high reliability can be performed reproducing a signal having less interference. FIG. 2 shows an example of record magnetized states (magnetized states of the sub-tracks STR1 to STR3) at an information bit rate of a sequence of four-ary symbols on the three sub-tracks STR1 to STR3.

A second feature of the present embodiment is to apply appropriate (e.g., optimum) mapping of a binary record sequence onto four-ary record symbols. For example, two bits of information can be assigned to one four-ary symbol because $4=2^2$. Likewise, four bits of information can be assigned to two four-ary symbols because $4^2=2^4$.

If bit labels are assigned to all patterns that can be expressed by n number of four-ary symbols, then the mapping rules will include a pattern that is the lowest in noise tolerance from among multiple patterns which can be taken on by n number of four-ary symbols. In this case, the arrangement interval of magnetization information along a down-track direction on the sub-tracks STR1 to STR3 needs to be widened allowing for the pattern that is the lowest in noise tolerance, so that it is difficult to improve the linear record density of symbols on the recording medium 11.

Hence, in the present embodiment, mapping rules are used in which $2^{2n-1}$ or fewer types of bit labels are mapped onto n number of four-ary symbols. That is, mapping rules in which bit labels are mapped preferentially onto patterns higher in noise tolerance from among multiple patterns which can be taken on by n number of four-ary symbols is used. The mapping rules are made not to include a pattern that is the lowest in noise tolerance from among multiple patterns which can be taken on by n number of four-ary symbols. For example, in the mapping rules, 2n−1 bits of bit labels are mapped onto n number of four-ary symbols. Note that the n number of four-ary symbols are dealt with as a set of four-ary symbols.

Where n=2, since $(4^2=16)>(2^3=8)$, it is possible to assign three bits of bit labels to two four-ary symbols. At this time, there is imposed the restriction that eight patterns of 16 patterns which can be expressed by the two four-ary symbols are used for information representation while the remaining eight patterns do not emerge as a record symbol.

Figure 3:
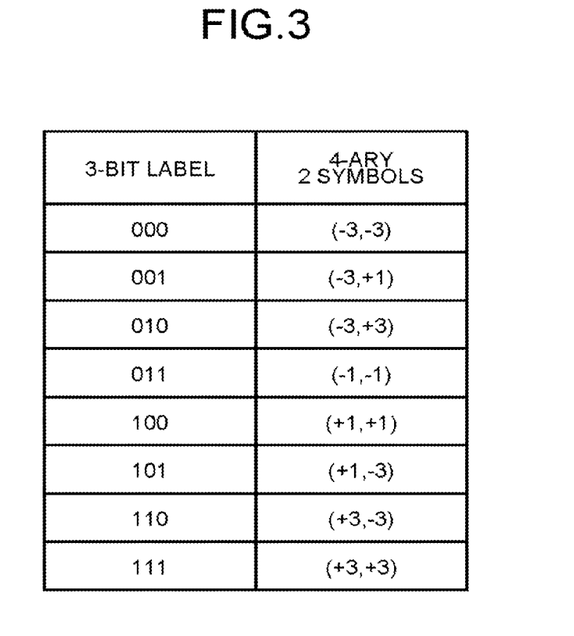
FIG. 3 is a diagram showing an example of mapping rules in the embodiment.

For example, FIG. 3 illustrates mapping rules in which three bits of bit labels (three-bit labels) are mapped onto two four-ary symbols (4-ary 2 symbols). The mapping rules of FIG. 3 include eight patterns out of 16 patterns which can be taken on by the two four-ary symbols: (−3,−3), (−3,+1), (−3,+3), (−1,−1), (+1,+1), (+1,−3), (+3,−3), and (+3,+3).

Figure 4:
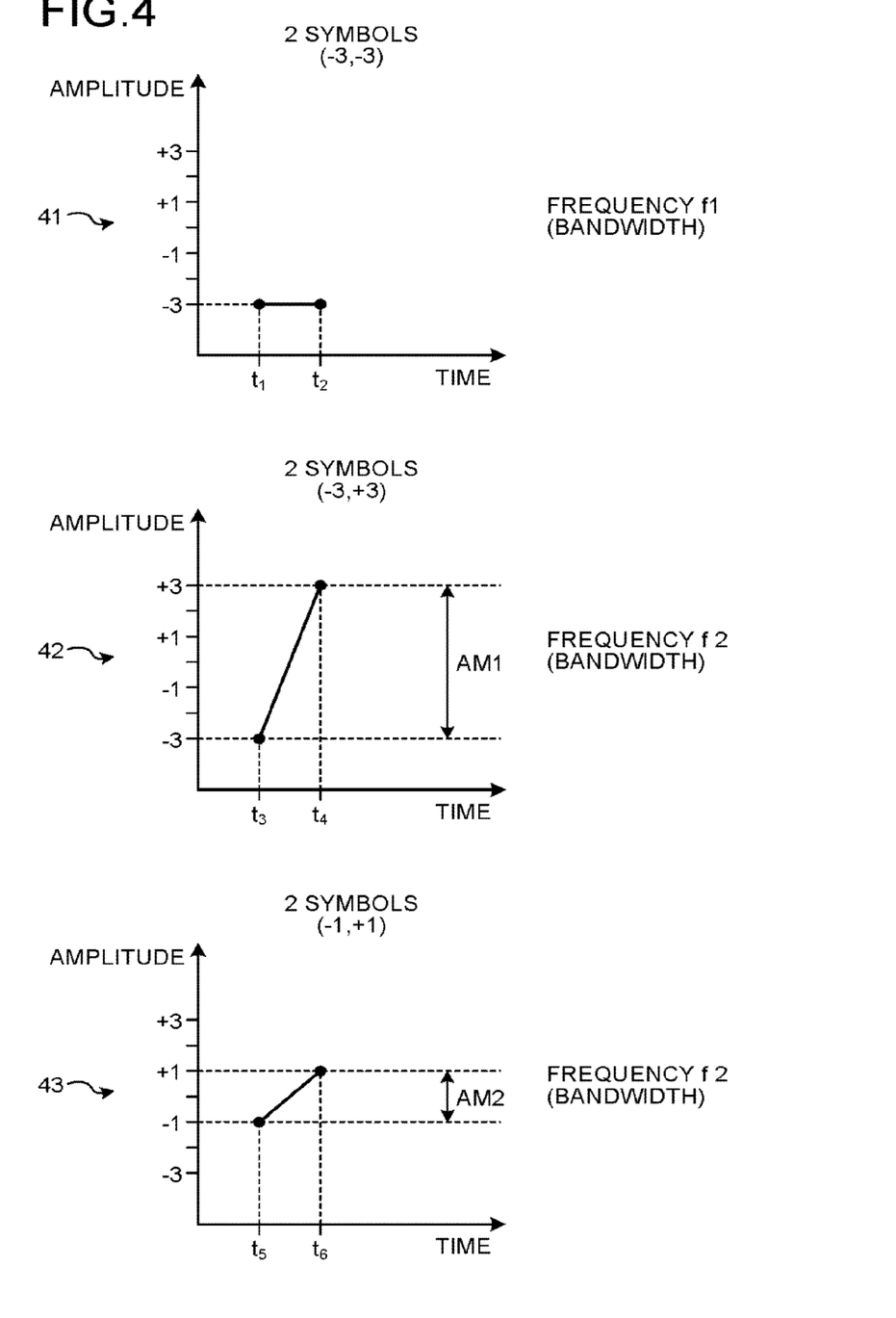
FIG. 4 is a diagram showing frequencies and amplitudes of two-symbol patterns in the embodiment.

As shown by a graph 41 in FIG. 4, the two-symbol pattern (−3,−3) is one where two or more symbols having the same value follow one after another and hence is lower in frequency or narrower in necessary signal bandwidth than a pattern not included in the mapping rules. FIG. 4 is a diagram showing the frequencies and amplitudes of two-symbol patterns. For example, the pattern not included in the mapping rules is a two-symbol pattern (−1,+1) shown in a graph 43 in FIG. 4. For the two-symbol pattern (−1,+1), a value of −1 is recorded at time t5, and a value of +1 is recorded at time t6, so that the frequency of the signal recorded on the recording medium 11 is at f2. In contrast, for the two-symbol pattern (−3,−3) shown in a graph 41, a value of −3 is recorded at time t1, and a value of −3 is recorded at time t2, so that the frequency (bandwidth) of the signal recorded on the recording medium 11 is at f1 (<f2).

Figure 5:
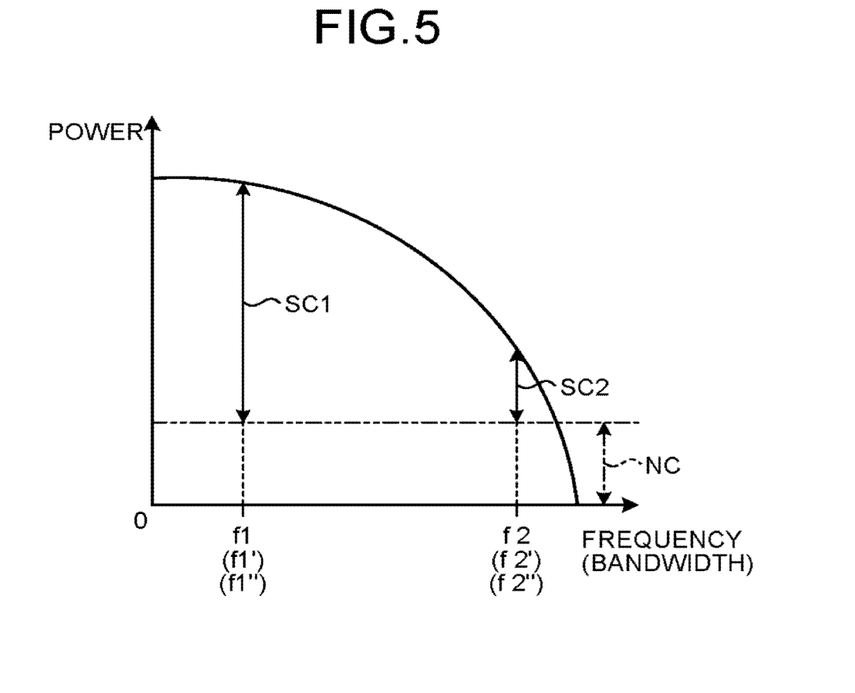
FIG. 5 is a graph showing relation between the power and frequencies of signals in the embodiment.

In this case, the relation between the power and frequencies of the signals recorded on the recording medium 11 is as shown in FIG. 5. That is, because of having large power, the signal of frequency f1 has a large S/N ratio, SC1/NC, whereas the signal of frequency f2 (>f1) is likely to have a small S/N ratio, SC2/NC, because of having small power. That is, there is the relation that (SC1)/(NC)>(SC2)/(NC). NC denotes the power of a noise component called system noise or Gaussian noise. SC1 is the power of a signal component obtained by removing the power of the noise component from the power of the signal at frequency f1. SC2 is the power of a signal component obtained by removing the power of the noise component from the power of the signal at frequency f2.

That is, the two-symbol pattern (−3,−3) whose signal frequency is at f1 is a pattern likely to have a larger S/N ratio and higher in noise tolerance as compared with the two-symbol pattern (−1,+1) whose signal frequency is at f2. As the two-symbol pattern (−3,−3), the two-symbol patterns (−1,−1), (+1,+1), (+3,+3), and so on shown in FIG. 3 are also lower in frequency than patterns not included in the mapping rules.

Further, as shown by a graph 42 in FIG. 4, the two-symbol pattern (−3,+3) includes both a symbol having the maximum of the four values and a symbol having the minimum of the four values and thus is larger in amplitude than a pattern not included in the mapping rules. For example, the pattern not included in the mapping rules is the two-symbol pattern (−1,+1) shown in the graph 43 in FIG. 4. For the two-symbol pattern (−1,+1), a value of −1 is recorded at time t5, and a value of +1 is recorded at time t6, so that the amplitude of the signal recorded on the recording medium 11 is at AM2. In contrast, for the two-symbol pattern (−3,+3), a value of −3 is recorded at time t3, and a value of +3 is recorded at time t4, so that the amplitude of the signal recorded on the recording medium 11 is at AM1 (>AM2).

That is, the two-symbol pattern (−3,+3) whose signal amplitude is at AM1 is a pattern likely to have a larger S/N ratio and higher in noise tolerance as compared with the two-symbol pattern (−1,+1) whose signal amplitude is at AM2. As the two-symbol pattern (−3,+3), the two-symbol pattern (+3,−3) and so on shown in FIG. 3 are also larger in amplitude than patterns not included in the mapping rules.

The two-symbol patterns (−3,+1), (−1,+3) shown in FIG. 3 are the second largest in amplitude after the patterns (−3,+3), (+3,−3) from among multiple patterns which can be taken on by two four-ary symbols.

Note that the mapping rules shown in FIG. 3 need preferentially include patterns higher in noise tolerance from among multiple patterns which can be taken on by two four-ary symbols, correspondences between three-bit labels and 4-ary 2 symbols not being limited to what are shown in FIG. 3.

Likewise, where n=3, since $(4^3=64)>(2^5=32)$, it is possible to assign five bits of bit labels to three four-ary symbols. At this time, there is imposed the restriction that 32 patterns out of 64 patterns which can be expressed by the three four-ary symbols are used for information representation while the remaining 32 patterns do not emerge as a record symbol.

Figure 6:
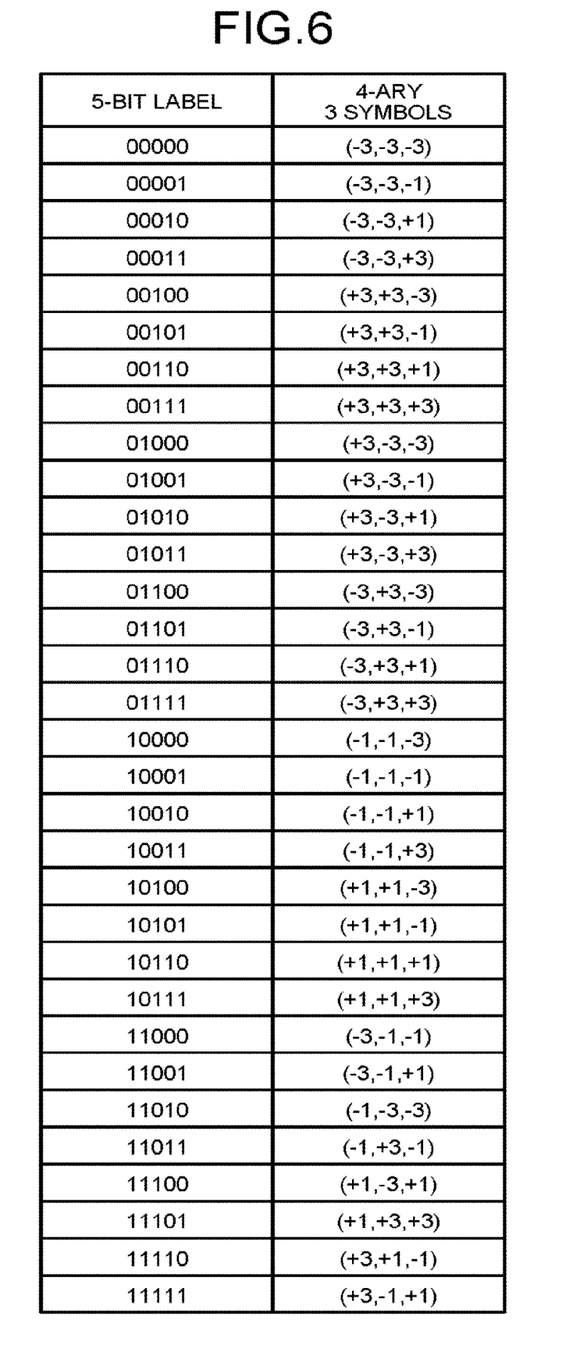
FIG. 6 is a diagram showing another example of mapping rules in the embodiment.

For example, FIG. 6 illustrates mapping rules in which five bits of bit labels (five-bit labels) are mapped onto three four-ary symbols (4-ary 3 symbols). The mapping rules of FIG. 6 include 32 patterns, illustrated in FIG. 6, of 64 patterns which can be taken on by the three four-ary symbols.

Figure 7:
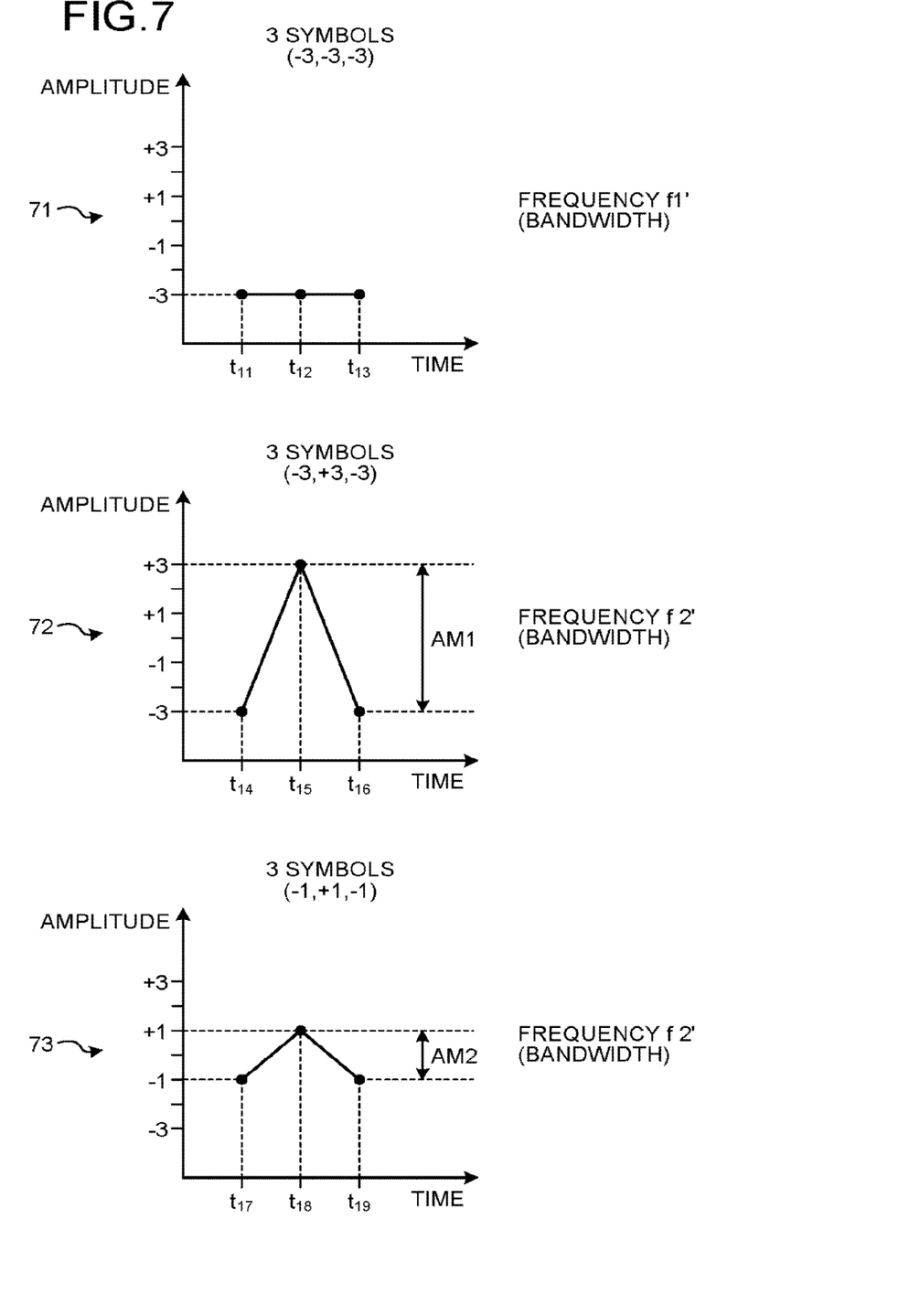
FIG. 7 is a diagram showing frequencies and amplitudes of three-symbol patterns in the embodiment.

As shown in a graph 71 in FIG. 7, the three-symbol pattern (−3,−3,−3) is one where two or more symbols having the same value follow one after another and hence is lower in frequency or narrower in signal bandwidth than a pattern not included in the mapping rules. FIG. 7 is a diagram showing the frequencies and amplitudes of three-symbol patterns. For example, the pattern not included in the mapping rules is a three-symbol pattern (−1,+1,−1) shown in a graph 73 in FIG. 7. For the three-symbol pattern (−1,+1,−1), a value of −1 is recorded at time t17, a value of +1 is recorded at time t18, and a value of −1 is recorded at time t19, so that the frequency of the signal recorded on the recording medium 11 is at f2'. In contrast, for the three-symbol pattern (−3,−3,−3) shown in a graph 71, a value of −3 is recorded at time t11, a value of −3 is recorded at time t12, and a value of −3 is recorded at time t13, so that the frequency (band) of the signal recorded on the recording medium 11 is at f1' (<f2').

In this case, the relation between the power and frequencies of the signals recorded on the recording medium 11 is as shown in FIG. 5. That is, because of having large power, the signal of frequency f1' has a large S/N ratio, SC1/NC, whereas the signal of frequency f2' (>f1') is likely to have a small S/N ratio, SC2/NC, because of having small power. There is the relation that (SC1)/(NC)>(SC2)/(NC). That is, the three-symbol pattern (−3,−3,−3) whose signal frequency is at f1' is a pattern likely to have a larger S/N ratio and higher in noise tolerance as compared with the three-symbol pattern (−1,+1,−1) whose signal frequency is at f2'. As the three-symbol pattern (−3,−3,−3), the three-symbol patterns (+3,+3,+3), (−1,−1,−1), (+1,+1,+1), (−3,−3,−1), (−3,−3,+1), (−3,−3,+3), (+3,+3,−3), (+3,+3,−1), (+3,+3,+1), (+3,−3,−3), (−3,+3,+3), (−1,−1,−3), (−1,−1,+1), (−1,−1,+3), (+1,+1,−3), (+1,+1,−1), (+1,+1,+3), (−3,−1,−1), (−1,−3,−3), (+1,+3,+3), (+3,+1,+1), and so on shown in FIG. 6 are also lower in frequency than patterns not included in the mapping rules.

Further, as shown by a graph 72 in FIG. 7, the three-symbol pattern (−3,+3,−3) includes both a symbol having the maximum of the four values and a symbol having the minimum of the four values and thus is larger in amplitude than a pattern not included in the mapping rules. For example, the pattern not included in the mapping rules is the three-symbol pattern (−1,+1,−1) shown in the graph 73 in FIG. 7. For the three-symbol pattern (−1,+1,−1), a value of −1 is recorded at time t17, a value of +1 is recorded at time t18, and a value of −1 is recorded at time t19, so that the amplitude of the signal recorded on the recording medium 11 is at AM2. In contrast, for the three-symbol pattern (−3,+3,−3), a value of −3 is recorded at time t14, a value of +3 is recorded at time t15, and a value of −3 is recorded at time t16, so that the amplitude of the signal recorded on the recording medium 11 is at AM1 (>AM2). That is, the three-symbol pattern (−3,+3,−3) whose signal amplitude is at AM1 is a pattern likely to have a larger S/N ratio and higher in noise tolerance as compared with the three-symbol pattern (−1,+1,−1) whose signal amplitude is at AM2. As the three-symbol pattern (−3,+3,−3), the three-symbol patterns (−3,−3,+3), (+3,−3,−3), (+3,−3,−1), (+3,−3,+1), (+3,−3,+3), (−3,+3,−3), (−3,+3,−1), (−3,+3,+1), (−3,+3,+3), and so on shown in FIG. 6 are also larger in amplitude than patterns not included in the mapping rules.

The three-symbol patterns (−3,−1,+1), (−1,+3,−1), (+1, −3,+1), (+3,+1,−1), and (+3,−1,+1) shown in FIG. 6 are the second largest in amplitude after the patterns (−3,+3,−3), (−3,−3,+3), (+3,−3,−3), (+3,−3,−1), (+3,−3,+1), (+3,−3,+3), (−3,+3,−3), (−3,+3,−1), (−3,+3,+1), and (−3,+3,+3) from among multiple patterns which can be taken on by three four-ary symbols.

Note that the mapping rules shown in FIG. 6 need preferentially include patterns higher in noise tolerance from among multiple patterns which can be taken on by three four-ary symbols, correspondences between five-bit labels and 4-ary 3 symbols not being limited to what are shown in FIG. 6.

Likewise, where n=4, since $(4^4=256)>(2^7=128)$, it is possible to assign seven bits of bit labels to four four-ary symbols. At this time, there is imposed the restriction that 128 patterns out of 256 patterns which can be expressed by the four four-ary symbols are used for information representation while the remaining 128 patterns do not emerge as a record symbol.

For example, in FIG. 8, mapping rules in which seven bits of bit labels (seven-bit labels) are mapped onto four four-ary symbols (4-ary 4 symbols) are illustrated in the form of tables 81 to 84. The tables 81 to 84 are one single table and divided it into for convenience of drawing. The mapping rules of FIG. 8 include 128 patterns, illustrated in FIG. 8, of 256 patterns which can be taken on by the four four-ary symbols.

Figure 9:
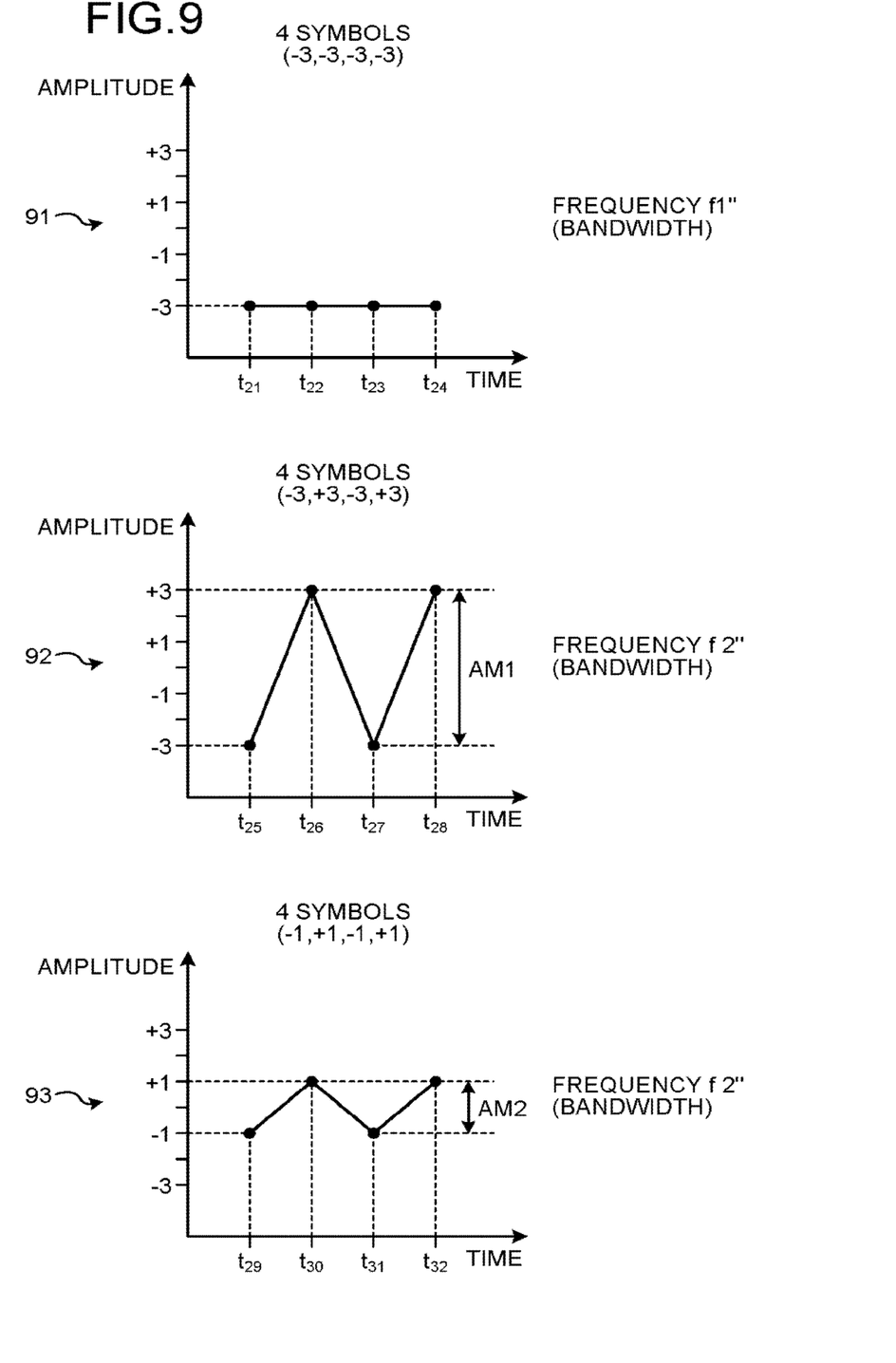
FIG. 9 is a diagram showing frequencies and amplitudes of four-symbol patterns in the embodiment.

As shown in a graph 91 in FIG. 9, the four-symbol pattern (−3,−3,−3,−3) is one where two or more symbols having the same value follow one after another and hence is lower in frequency or narrower in signal bandwidth than a pattern not included in the mapping rules. FIG. 9 is a diagram showing the frequencies and amplitudes of four-symbol patterns. For example, the pattern not included in the mapping rules is a four-symbol pattern (−1,+1,−1,+1) shown in a graph 93 in FIG. 9. For the four-symbol pattern (−1,+1,−1,+1), a value of −1 is recorded at time t29, a value of +1 is recorded at time t30, a value of −1 is recorded at time t31, and a value of +1 is recorded at time t32, so that the frequency of the signal recorded on the recording medium 11 is at f2". In contrast, for the four-symbol pattern (−3,−3,−3,−3) shown in a graph 91, a value of −3 is recorded at time t21, a value of −3 is recorded at time t22, a value of −3 is recorded at time t23, and a value of −3 is recorded at time t24, so that the frequency of the signal recorded on the recording medium 11 is at f1" (<f2").

In this case, the relation between the power and frequencies of the signals recorded on the recording medium 11 is as shown in FIG. 5. That is, because of having large power, the signal of frequency f1" has a large S/N ratio, SC1/NC, whereas the signal of frequency f2" (>f1") is likely to have a small S/N ratio, SC2/NC, because of having small power. There is the relation that SC1/NC>SC2/NC. That is, the four-symbol pattern (−3,−3,−3,−3) whose signal frequency is at f1" is a pattern likely to have a larger S/N ratio and higher in noise tolerance as compared with the four-symbol pattern (−1,+1,−1,+1) whose signal frequency is at f2". As the four-symbol pattern (−3,−3,−3,−3), the four-symbol patterns (−3,−3,−3,−1), (−3,−3,−3,+1), (−3,−3,−3,+3), (−3,−3, −1,−3), (−3,−3,−1,−1), (−3,−3,−1,+3), (−3,−3,+1,−3), (−3, −3,+1,+1), (−3,−3,+1,+3), (−3,−3,+3,−3), (−3,−3,+3,−1), (−3,−3,+3,+1), (−3,−3,+3,+3), (−3,−1,−3,−3), (−3,−1,−1, −3), (−3,−1,−1,−1), (−3,−1,−1,+1), (−3,−1,−1,+3), (−3,−1, +1,+1), (−3,−1,+3,+3), (−3,+1,−3,−3), (−3,+1,−1,−1), (−3, +1,+1,−3), (−3,+1,+1,−1), (−3,+1,+1,+1), (−3,+1,+1,+3), (−3,+1,+3,+3), (−3,+3,−3,−3), (−3,+3,−1,−1), (−3,+3,+1, +1), (−3,+3,+3,−3), (−3,+3,+3,−1), (−3,+3,+3,+1), (−3,+3, +3,+3), (−1,−3,−3,−3), (−1,−3,−3,+3), (−1,−3,−1,−1), (−1, −3,+1,+1), (−1,−3,+3,+3), (−1,−1,−3,−3), (−1,−1,−3,−1), (−1,−1,−3,+1), (−1,−1,−3,+3), (−1,−1,−1,−3), (−1,−1,−1, +3), (−1,−1,+1,−3), (−1,−1,+1,+3), (−1,−1,+3,−3), (−1,−1, +3,−1), (−1,−1,+3,+3), (−1,+1,+1,−3), (−1,+1,+1,+3), (−1, +1,+3,+1), (−1,+1,+3,+3), (−1,+3,−3,−3), (−1,+3,−1,−1), (−1,+3,+1,+1), (−1,+3,+3,−3), (−1,+3,+3,+3), (+1,−3,−3, −3), (+1,−3,−3,+3), (+1,−3,−1,−1), (+1,−3,+1,+1), (+1,−3, +3,+3), (+1,−1,−3,−3), (+1,−1,−1,−3), (+1,−1,+1,+3), (+1, +1,−3,−3), (+1,+1,−3,+1), (+1,+1,−3,+3), (+1,+1,−1,−3), (+,+1,−1,+3), (+,+1,+1,−3), (+1,+1,+1,+3), (+1,+1,+3,−3), (+1,+1,+3,−1), (+1,+1,+3,+1), (+1,+1,+3,+3), (+1,+3,−3, −3), (+1,+3,−1,−1), (+1,+3,+1,+1), (+1,+3,+3,−3), (+1,+3, +3,+3), (+3,−3,−3,−3), (+3,−3,−3,−1), (+3,−3,−3,+1), (+3, −3,−3,+3), (+3,−3,−1,−1), (+3,−3,+1,+1), (+3,−3,+3,+3), (+3,−1,−3,−3), (+3,−1,−1,−3), (+3,−1,−1,−1), (+3,−1,−1, +1), (+3,−1,−1,+3), (+3,−1,+1,+3), (+3,−1,+3,+3), (+3,+1, −3,−3), (+3,+1,−1,−3), (+3,+1,−1,−1), (+3,+1,+1,−3), (+3, +1,+1,−1), (+3,+1,+1,+1), (+3,+1,+1,+3), (+3,+1,+3,+3), (+3,+3,−3,−3), (+3,+3,−3,−1), (+3,+3,−3,+1), (+3,+3,−3, +3), (+3,+3,−1,−3), (+3,+3,−1,−1), (+3,+3,+1,−3), (+3,+3, +1,+1), (+3,+3,+1,+3), (+3,+3,+3,−3), (+3,+3,+3,−1), (+3, +3,+3,+1), (+3,+3,+3,+3), and so on shown in FIG. 6 are also lower in frequency than patterns not included in the mapping rules.

Further, as shown by a graph 92 in FIG. 9, the four-symbol pattern (−3,+3,−3,+3) includes both a symbol having the maximum of the four values and a symbol having the minimum of the four values and thus is larger in amplitude than a pattern not included in the mapping rules. For example, the pattern not included in the mapping rules is the four-symbol pattern (−1,+1,−1,+1) shown in the graph 93 in FIG. 9. For the four-symbol pattern (−1,+1,−1,+1), a value of −1 is recorded at time t29, a value of +1 is recorded at time t30, a value of −1 is recorded at time t31, and a value of +1 is recorded at time (t32), so that the amplitude of the signal recorded on the recording medium 11 is at AM2. In contrast, for the four-symbol pattern (−3,+3,−3,+3), a value of −3 is recorded at time t25, a value of +3 is recorded at time t26, a value of −3 is recorded at time t27, and a value of +3 is recorded at time t28, so that the amplitude of the signal recorded on the recording medium 11 is at AM1 (>AM2). That is, the four-symbol pattern (−3,+3,−3,+3) whose signal amplitude is at AM1 is a pattern likely to have a larger S/N ratio and higher in noise tolerance as compared with the four-symbol pattern (−1,+1,−1,+1) whose signal amplitude is at AM2. The four-symbol patterns (−3,−3,−3, +3), (−3,−3,−1,+3), (−3,−3,+1,+3), (−3,−3,+3,−3), (−3,−3, +3,−1), (−3,−3,+3,+1), (−3,−3,+3,+3), (−3,−1,−1,+3), (−3, −1,+1,+3), (−3,−1,+3,+3), (−3,+1,+1,+3), (−3,+1,+3,+3), (−3,+3,−3,−3), (−3,+3,−1,−1), (−3,+3,+1,+1), (−3,+3,+3, −3), (−3,+3,+3,−1), (−3,+3,+3,+1), (−3,+3,+3,+3), (−1,−3, −3,+3), (−1,−3,+3,+3), (−1,−1,−3,+3), (−1,−1,+3,−3), (−1, +1,+3,−3), (−1,+3,−3,−3), (−1,+3,+3,−3), (+1,−3,−3,+3), (+1,−3,+3,+3), (+1,−1,−3,+3), (+1,+1,−3,+3), (+1,+1,+3, −3), (+1,+3,−3,−3), (+1,+3,+3,−3), (+3,−3,−3,−3), (+3,−3, −3,+3), (+3,−3,−1,−1), (+3,−3,+1,+1), (+3,−3,+3,+3), (+3, −1,−3,−3), (+3,−1,−1,−3), (+3,+1,−3,−3), (+3,+1,−1,−3), (+3,+1,+1,−3), (+3,+3,−3,−3), (+3,+3,−3,−1), (+3,+3,−3, +1), (+3,+3,−3,+3), (+3,+3,−1,−3), (+3,+3,+1,−3), (+3,+3, +3,−3), and so on shown in FIG. 8 are also larger in amplitude than patterns not included in the mapping rules, as the four-symbol pattern (−3,+3,−3,+3) is.

The four-symbol patterns not cited above of all the four-symbol patterns shown in FIG. 8 are the second largest in amplitude after the patterns (−3,−3,−3,+3) to (+3,+3,+3, −3) cited above from among multiple patterns which can be taken on by four four-ary symbols.

Note that the mapping rules shown in FIG. 8 need preferentially include patterns higher in noise tolerance from among multiple patterns which can be taken on by four four-ary symbols, correspondences between seven-bit labels and 4-ary 4 symbols not being limited to what are shown in FIG. 8.

Next, specific implementation of the above mapping rules will be described. In the present embodiment, the storage device 1 holds mapping rules in which multiple bits (bit labels) of a binary record sequence are mapped onto n number of four-ary symbols. The storage device 1 converts a bit pattern of user data into n number of four-ary symbols in units of 2n−1 bits according to the mapping rules and records each of the converted four-ary symbols as a four-level signal onto the recording medium 11 (see FIG. 2).

At this time, it is difficult to achieve appropriately (e.g., optimally) reconstruction of (decoding into) a binary record information sequence (user data) by detecting one four-ary symbol from the recording medium 11. That is, the storage device 1 can maintain the appropriateness (e.g., optimalness) of the decoding process by detecting units of n symbols containing multiple bits from the signal read from the recording medium 11 (that is, equalizing it into sets of n number of four-ary symbols). Where multiple bits of binary information (user data) directly correspond to one symbol of error correcting codes (ECC), an encoded symbol after ECC encoding directly corresponds to n number of four-ary symbols, and a symbol after detection in units of n symbols directly corresponds to an ECC encoded symbol, and hence the decoding process can be performed directly on ECC.

This process is convenient in producing (reconstructing) a record sequence of four-ary symbols because of dealing with the record sequence where ECC encoded symbols are expressed directly in four values without considering a binary sequence (bit labels). Further, this process is excellent in maintaining optimal-ness of the operation when decoding. For example, ECC such as RS (Reed-Solomon) code and non-binary LDPC (Low Density Parity Check) code can be thought of as what deals with multiple binary bits in the form of one symbol of an encoded sequence.

Figure 10:
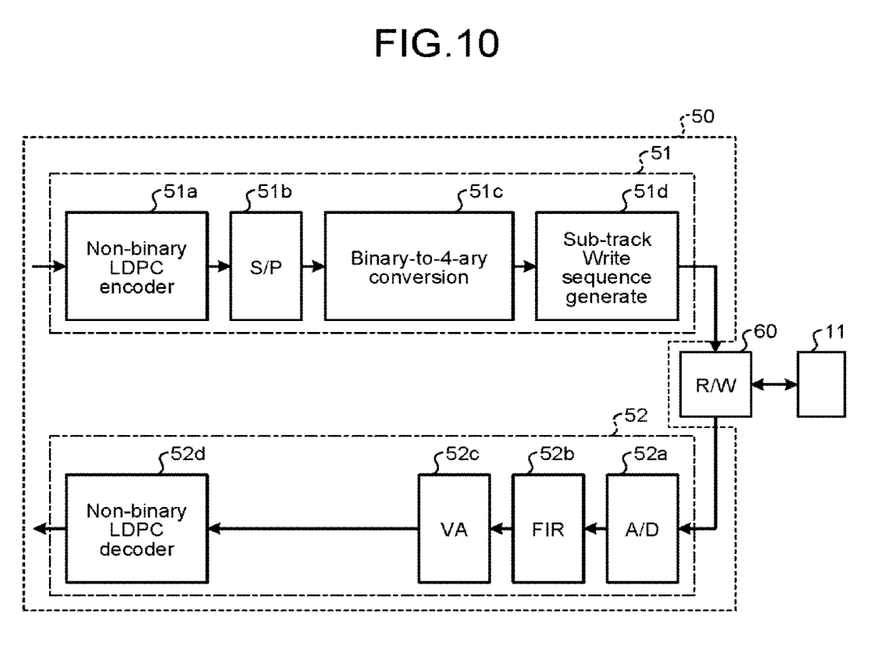
FIG. 10 is a diagram showing configuration of a controller in the embodiment.

FIG. 10 shows an example of a basic record/reproduce processing system (controller 50) of a magnetic recording system configured to generate a sub-track record sequence using non-binary LDPC code as ECC. In the present embodiment, in the storage device 1, the controller 50 as shown in FIG. 10 is functionally realized. FIG. 10 is a diagram showing the configuration of the controller 50. The controller 50 shown in FIG. 10 is a functional configuration and may be implemented by hardware (e.g., as a system-on-chip) in the HDC 31 or the like. Or the controller 50 shown in FIG. 10 may be implemented by software in the control unit 26 or the like (e.g., as a function module that is developed by the control unit 26 or the like in the memory 27 for operation or the like at one time or sequentially as the process proceeds). Or the controller 50 shown in FIG. 10 may have part of its function implemented by hardware in the HDC 31 or the like and the rest implemented by software in the control unit 26 or the like.

The controller 50 has a data generating unit 51 and a data reconstructing unit 52. The data generating unit 51 writes information onto the recording medium 11 via a read/write (R/W) interface 60 based on user data (information bits). The data reconstructing unit 52 reconstructs user data based on information read from the recording medium 11 via the R/W interface 60. The R/W interface 60 may include, for example, the head 22, the head amplifier 24, and the RWC 25 (see FIG. 1).

The data generating unit 51 comprises a non-binary LDPC encoder 51a, a serial/parallel converter (S/P) 51b, a data converter (binary-to-4-ary conversion) 51c, and a writing control unit (sub-track write sequence generate) 51d as shown in FIG. 10. The data converter 51c holds the previously-described mapping rules.

The non-binary LDPC encoder 51a LDPC-encodes user data over $GF(2^{2n-1})$ to generate code words. Although herein $GF(2^{2n-1})$ is used as a Galois extension field, the Galois extension field used in LDPC encoding is not limited to this. Further, although herein LDPC code is used as an example of error correcting code for user data, not being limited to this, other code such as convolution code or RS (Reed Solomon) code may be used as the error correcting code.

Where LDPC encoding is performed, and 2n−1 bits of user data is recorded using n record symbols, if $GF(2^{2n-1})$ is used in encoding, 2n−1 bits of user data can be dealt with as an element of $GF(2^{2n-1})$. For example, when n=2, if GF(8) is used in encoding in order to record three bits of user data using two record symbols, the three bits of user data can be dealt with as an element of GF(8).

The serial/parallel converter 51b converts serial data (a width of one bit) into parallel data of 2n−1 bits width. The 2n−1 bits correspond in the number of bits to one symbol.

For example, where n=2, the serial/parallel converter 51b converts serial data (of one bit width) into parallel data of three bits width. The serial/parallel converter 51b outputs the parallel data of three bits width to the data converter 51c.

The data converter 51c converts 2n−1 bits of user data (parallel data of 2n−1 bits width) into n number of four-ary record symbols according to the previously-described mapping rules and outputs the n converted record symbols to the writing control unit 51d.

For example, where n=2, the data converter 51c converts three bits of user data (parallel data of three bits width) into two four-ary record symbols according to the mapping rules shown in FIG. 3. If the three bits of user data is "000", this three bits is converted into (−3,−3). The mapping rules of FIG. 3 is one example, and correspondences between specific values of three bits of user data and of two record symbols are not limited to the example of FIG. 3. Values of two record symbols need only correspond to $2^3$ states of three bits of user data one on one.

The writing control unit 51d generates a write signal based on record symbols output from the data converter 51c to record (write) onto the recording medium 11 via the R/W interface 60. A signal of four levels corresponding to four-ary symbols is recorded onto the recording medium 11 as shown in FIG. 2.

The writing control unit 51d converts record symbols into arrangements of magnetized states as shown in FIG. 2 and generates a write signal to write magnetization information according to the converting result so as to record onto the recording medium 11 by the write head 22a.

For example, the width of the write head 22a may be made equal to the width of the sub-tracks STR1, STR2, STR3, and the storage device 1 may record magnetization information onto each of the sub-tracks STR1 to STR3. At this time, a plurality of the write heads 22a may be prepared, and magnetization information may be recorded onto the sub-tracks STR1, STR2, STR3 simultaneously by the plurality of write heads 22a. If the record symbol is of −1, magnetization information of −1, of −1, and of +1 are respectively recorded onto the sub-tracks STR1, STR2, STR3 at positions along an across-track direction by the write heads 22a (see FIG. 2).

Or, for example, the width of the write head 22a may be made greater than the width of the sub-tracks STR1, STR2, STR3, and the storage device 1 may record magnetization information onto each of the sub-tracks STR1 to STR3 by a shingled recording scheme. If the record symbol is of −1, magnetization information of −1 is recorded onto the sub-tracks STR1, STR2, STR3 at positions along an across-track direction by the write head 22a. Then the write head 22a is shifted by one sub-track width toward the STR3, and magnetization information of −1 is recorded onto the sub-tracks STR2, STR3 by the write head 22a. The write head 22a is further shifted by one sub-track width toward the STR3, and magnetization information of +1 is recorded onto the sub-track STR3 by the write head 22a (see FIG. 2).

Next, a method of reading data from the recording medium 11, that is, a reproducing method will be described. For example, the storage device 1 reads magnetization information simultaneously from the three sub-tracks STR1 to STR3 using one read head 22b having a width corresponding to the total width of the three sub-tracks. Thus, the data reconstructing unit 52 can reproduce a signal corresponding to these values sequentially from regions where symbols of $(-1,-1,+1)=-1$, $(+1,+1,+1)=+3$, $(-1,+1,+1)=+1$, and $(-1,-1,-1)=-3$ are recorded as shown in FIG. 2.

Or the storage device 1 may read magnetization information simultaneously from the three sub-tracks STR1 to STR3 using three read heads 22b each having a width corresponding to the width of one sub-track. The data reconstructing unit 52 combines signals read by the three read heads 22b. Or the storage device 1 may read magnetization information sequentially from the three sub-tracks STR1 to STR3 using one read head 22b having a width corresponding to the width of one sub-track. The data reconstructing unit 52 combines signals sequentially read by the one read head 22b. Thus, the data reconstructing unit 52 can reproduce a signal corresponding to these values sequentially from regions where symbols of $(-1,-1,+1)=-1$, $(+1,+1,+1)=+3$, $(-1,+1,+1)=+1$, and $(-1,-1,-1)=-3$ are recorded as shown in FIG. 2.

The data reconstructing unit 52 comprises an AD (Analog-to-Digital) converter (A/D) 52a, an FIR (Finite Impulse Response) filter (FIR) 52b, a Viterbi equalizer (VA) 52c, and a non-binary LDPC decoder 52d as shown in FIG. 10.

The AD converter 52a receives the analog signal read from the recording medium 11 via the R/W interface 60. The AD converter 52a converts the analog signal into a digital signal and inputs to the FIR filter 52b. The FIR filter 52b performs FIR equalization on the digital signal and inputs to the Viterbi equalizer 52c. The Viterbi equalizer 52c performs Viterbi equalization on the input digital signal to calculate likelihoods and inputs to the non-binary LDPC decoder 52d. The non-binary LDPC decoder 52d performs LDPC decoding using the likelihoods.

The Viterbi equalizer 52c processes n number of four-ary symbols in a batch, for example. That is, the Viterbi equalizer 52c equalizes the signal read from the recording medium 11 into sets of n four-ary symbols (a set of symbols). For example, the Viterbi equalizer 52c can realize the start of a data area by detecting a sync mark. Then the Viterbi equalizer 52c deals with a signal read from the start of a data area as the start of a set of symbols when reproducing data and can realize that after each group of n record regions (see FIG. 2), a boundary between sets of symbols comes. Not being limited to this, as the method of finding the start of a set of symbols, another method may be used such as the method where the control unit 26 that controls the entire controller 50 manages the start of each set of symbols and notifies the start of a first set of symbols of the input signal to the Viterbi equalizer 52c.

In Viterbi equalization, as to the state at a given time, the likelihoods of multiple paths (state paths) to that state are obtained, and the surviving path is obtained for each repetition. In the present embodiment, the number of states defined in the target is given by exponentiation of 4, $4^n$, and the number of branches extending out from each state is supposed to be, e.g., $4^n/2=2^{2n-1}$. Where n=2, the $2^{2n-1}$ branches correspond to eight data values (bit labels) shown in the mapping rules of FIG. 3. If four-ary symbols back to two previous times are considered, the number of branches is usually $4^2$ (=16), but in the present embodiment, let branches considered in Viterbi equalization be eight branches corresponding to eight types of bit values (bit labels) of the mapping rules of FIG. 3. Thus, in the trellis diagram, eight branches branch from each state at a first time. The likelihood of each branch is calculated, and the eight calculated likelihoods are input as likelihoods for three-bit values shown on the left side of the mapping rules of FIG. 3 to the non-binary LDPC decoder 52d. The likelihoods output from the Viterbi equalizer 52c are the respective likelihoods of the symbol labels of an eight-ary symbol (non-binary symbol) expressed in three bits, for example, the likelihood of "000", the likelihood of "001", . . . . The non-binary LDPC decoder 52d performs LDPC decoding over GF(8) using the eight calculated likelihoods.

The non-binary LDPC decoder 52d, dealing with 2n−1 bits as an element of $GF(2^{2n-1})$, performs decoding using the likelihoods input from the Viterbi equalizer 52c. The non-binary LDPC decoder 52d determines whether an end condition is satisfied and, if the end condition is satisfied, finishes the decoding. Specifically, the end condition is that a parity check is performed on temporary deduced words, resulting in the parity check result satisfying a specific condition, or that the number of repetitions reaches a predetermined upper limit. When the decoding finishes with the parity check result satisfying the specific condition, the decoding result (2n−1 bits of user data) is read and output as user data. When the decoding ends without the parity check result satisfying the specific condition because the number of repetitions has reached the upper limit, the decoder 52d notifies failure in decoding.

If the end condition is not satisfied, the non-binary LDPC decoder 52d inputs likelihoods calculated during the process to the Viterbi equalizer 52c to perform processing by the Viterbi equalizer 52c. The above processing by the Viterbi equalizer 52c and the non-binary LDPC decoder 52d is performed repeatedly.

In the present embodiment, the Viterbi equalizer 52c performs Viterbi equalization using $2^{2n-1}$ branches corresponding to $2^{2n-1}$ different values of 2n–1 bits of user data to input likelihoods corresponding to the 2n–1 bits of user data to the non-binary LDPC decoder 52d. Therefore, the process of converting n symbols into 2n–1 bits of user data (a converting process opposite to data conversion by the data converter 51c) need not be performed, and thus the reproducing process can be executed efficiently.

If code which does not use likelihoods in decoding (e.g., RS code) is used as the error correcting code, the Viterbi equalizer 52c may input a hard determination result to the decoder at the subsequent stage or a soft determination result (likelihoods) to the decoder.

For example, where RS code is used, an RS decoder is provided instead of the non-binary LDPC decoder 52d. The Viterbi equalizer 52c obtains the result of determining the bit value of 2n–1 bits by performing repetitive computation therein instead of a likelihood per 2n–1 bits of user data and can input this determining result to the RS decoder. Thus, the RS decoder can perform general RS decoding. Or the Viterbi equalizer 52c may input a likelihood per 2n–1 bits of user data to the RS decoder, and the RS decoder may perform soft determination RS decoding using the likelihoods.

Further, the data recording and reproducing method of the present embodiment can also be applied to the case where error correcting encoding is not performed. Where error correcting encoding is not performed, neither the non-binary LDPC encoder 51a nor the non-binary LDPC decoder 52d is necessary. In this case, the data converter 51c converts 2n–1 bits of user data not error correcting encoded into n symbols. Then these n symbols are recorded onto the recording medium 11 as where error correcting encoding is performed. In reproducing, the Viterbi equalizer 52c performs Viterbi equalization on the input signal using $2^{2n-1}$ branches corresponding to $2^{2n-1}$ different values of 2n–1 bits of user data as where error correcting encoding is performed and repeats Viterbi equalization to obtain the surviving path, thereby outputting the most likely 2n–1 bits of user data as the determining result.

As described above, in the present embodiment, in the storage device 1, the controller 50 holds mapping rules in which bit labels are mapped preferentially to patterns higher in noise tolerance from among multiple patterns which can be taken on by n number of four-ary symbols, where n is an integer of two or greater. The controller 50 converts data (a bit pattern) into sets of n number of four-ary symbols according to the mapping rules to record onto the recording medium 11. That is, the storage device 1 can increase the amount of information per record symbol by dealing with four-ary record symbols. Further, by selectively making patterns higher in noise tolerance from among multiple patterns which can be taken on by n number of four-ary symbols be included in the mapping rules, the S/N ratio of the reproduced signal in reproducing n number of four-ary symbols can be improved. Thus, while improving the record density of information, degradation in the quality (reliability) of the reproduced signal can be suppressed, or the quality (reliability) of the reproduced signal can be improved. Therefore, both suppression of degradation in the quality of the reproduced signal and improvement of information record density can be achieved.

Figure 11:
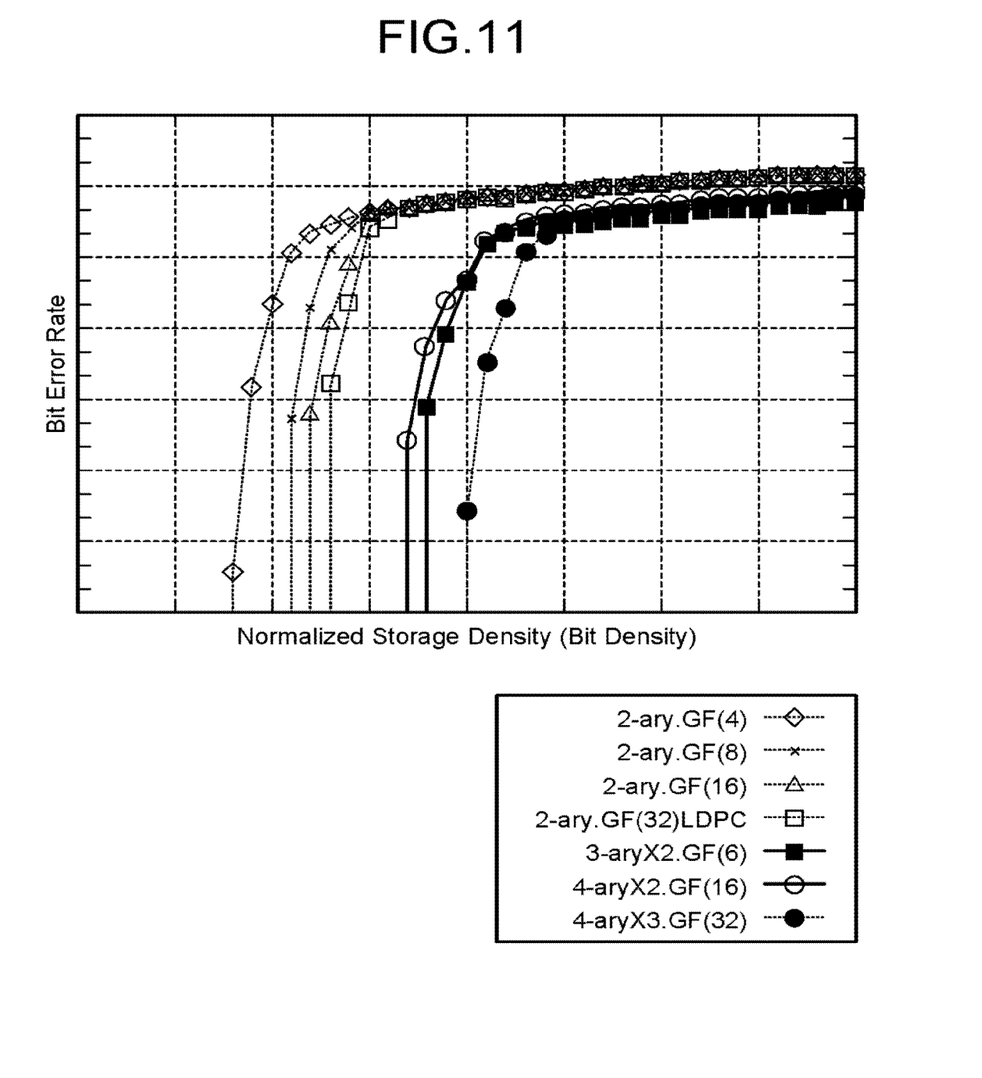
FIG. 11 is a diagram showing the operation of the storage device according to the embodiment.

For example, FIG. 11 shows that where data is recorded onto the recording medium 11 using the mapping rules in which three-bit bit labels are mapped onto two four-ary symbols (4-aryX2.GF(16)), degradation in the quality (reliability) of the reproduced signal can be suppressed, or the quality (reliability) of the reproduced signal can be improved while improving the record density of information, as compared with the case where binary symbols are recorded (2-ary.GF(4), 2-ary.GF(8), 2-ary.GF(16), 2-ary.GF(32)LDPC). For example, where data is recorded onto the recording medium 11 using the mapping rules in which three-bit bit labels are mapped onto two four-ary symbols, a further increase of 10% in the record density can be obtained as compared with the case where binary symbols are recorded.

Further, for example, FIG. 11 shows that where data is recorded onto the recording medium 11 using the mapping rules in which five-bit bit labels are mapped onto three four-ary symbols (4-aryX3.GF(32)), degradation in the quality (reliability) of the reproduced signal can be suppressed, or the quality (reliability) of the reproduced signal can be improved while improving the record density of information, as compared with the case where binary symbols are recorded (2-ary.GF(4), 2-ary.GF(8), 2-ary.GF(16), 2-ary.GF(32)LDPC) or where three-ary symbols are recorded (3-aryX2.GF(6)).

Note that FIG. 11 is a graph showing relations between the record density and bit error rate in the cases of using recording methods respectively. In FIG. 11, the vertical axis represents the magnitude of the bit error rate, and the horizontal axis represents the inverse of the symbol record pitch along a down-track direction per bit (information amount unit).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
   a data converter that converts data into sets of n number of four-ary symbols according to mapping rules in which $2^{2n-1}$ or fewer types of bit labels are mapped onto the n number of four-ary symbols, where n is an integer of two or greater;
   a recording medium onto which the converted n number of four-ary symbols are recorded in the form of a signal of one level among four levels; and
   an equalizer that equalizes a signal read from the recording medium into sets of the n number of four-ary symbols.

2. The storage device according to claim 1, wherein the mapping rules include multiple first patterns among multiple patterns which can be taken on by the n number of four-ary symbols, but not multiple second patterns.

3. The storage device according to claim 2, wherein the first patterns are higher in noise tolerance than the second patterns.

4. The storage device according to claim 2, wherein signal bandwidth of the first pattern is narrower than signal bandwidth of the second pattern.

5. The storage device according to claim 4, wherein in the first pattern, two or more symbols of a same value follow one after another.

6. The storage device according to claim 2, wherein
an amplitude of the first pattern is greater than an amplitude of the second pattern.

7. The storage device according to claim 6, wherein
the first pattern includes both a symbol having maximum value of the four values and a symbol having minimum value of the four values.

8. The storage device according to claim 1, wherein
in the mapping rules, bit labels of 2n−1 bits are mapped onto the n number of four-ary symbols.

9. The storage device according to claim 8, wherein
in the mapping rules, bit labels of three bits are mapped onto two four-ary symbols.

10. The storage device according to claim 8, wherein
in the mapping rules, bit labels of five bits are mapped onto three four-ary symbols.

11. The storage device according to claim 8, wherein
in the mapping rules, bit labels of seven bits are mapped onto four four-ary symbols.

12. The storage device according to claim 1, wherein
the recording medium is a disk medium, and
in the disk medium, one track onto which one symbol is recorded includes three sub-tracks onto which magnetization information is recorded individually.

13. The storage device according to claim 12, wherein
a signal of one level among four levels corresponding to combinations of respective magnetization information that are to be recorded onto the three sub-tracks is recorded onto the disk medium.

14. The storage device according to claim 13, wherein
the storage device reads out simultaneously respective magnetization information from the three sub-tracks by a head to take read out result as the signal.

15. The storage device according to claim 13, wherein
the storage device reads out individually respective magnetization information from the three sub-tracks by a head to combine the respective magnetization information read out from the three sub-tracks so as to reproduce a signal.

16. A controller comprising:
a data converter that converts data into sets of n number of four-ary symbols according to mapping rules in which $2^{2n-1}$ or fewer types of bit labels are mapped onto the n number of four-ary symbols, where n is an integer of two or greater;
a signal generator that generates a signal of one level among four levels based on the converted n number of symbols; and
an equalizer that equalizes a signal input externally into sets of the n number of four-ary symbols.

17. The controller according to claim 16, wherein
the mapping rules include multiple first patterns among multiple patterns which can be taken on by the n number of four-ary symbols, but not multiple second patterns, and
wherein the first patterns are higher in noise tolerance than the second patterns.

18. The controller according to claim 17, wherein
signal bandwidth of the first pattern is narrower than signal bandwidth of the second pattern.

19. The controller according to claim 17, wherein
an amplitude of the first pattern is greater than an amplitude of the second pattern.

20. A recording and reproducing method comprising:
converting data into sets of n number of four-ary symbols according to mapping rules in which $2^{2n-1}$ or fewer types of bit labels are mapped onto the n number of four-ary symbols, where n is an integer of two or greater;
recording the converted n number of symbols in the form of a signal of one level among four levels onto a recording medium; and
equalizing a signal read from the recording medium into sets of the n number of four-ary symbols.

* * * * *